(12) United States Patent
Keith et al.

(10) Patent No.: US 7,229,513 B2
(45) Date of Patent: Jun. 12, 2007

(54) METHOD FOR AN INTEGRAL COMPOSITE FORWARD FLANGE IN A COMPOSITE

(75) Inventors: William Preston Keith, Lakewood, CA (US); Joshua Andrew Chua, Huntington Beach, CA (US); Buddhadev Chakrabarti, Walnut, CA (US)

(73) Assignee: The Boeing Company, Chicago, IL (US)

( * ) Notice: Subject to any disclaimer, the term of this patent is extended or adjusted under 35 U.S.C. 154(b) by 443 days.

(21) Appl. No.: 10/698,540

(22) Filed: Oct. 31, 2003

(65) Prior Publication Data

US 2005/0095394 A1 May 5, 2005

(51) Int. Cl.
*B32B 37/00* (2006.01)
(52) U.S. Cl. ............................ 156/92; 156/91; 156/293
(58) Field of Classification Search .................. 156/92, 156/293, 91
See application file for complete search history.

(56) References Cited

U.S. PATENT DOCUMENTS

| | | | | |
|---|---|---|---|---|
| 4,854,990 A | * | 8/1989 | David | 156/173 |
| 5,789,061 A | * | 8/1998 | Campbell et al. | 156/92 |
| 2001/0035249 A1 | * | 11/2001 | Kondo et al. | 156/65 |

FOREIGN PATENT DOCUMENTS

EP 0396281 A2 * 11/1990

* cited by examiner

*Primary Examiner*—Jeff H. Aftergut
(74) *Attorney, Agent, or Firm*—Armstrong Teasdale LLP

(57) ABSTRACT

The present invention is directed toward a laminate composite structure and a method for fabricating a laminate composite structure, wherein the laminate composite structure comprises a solid laminate and a composite sandwich structure. The solid laminate includes a bend having composite pins inserted there through. The composite sandwich structure is comprised of a core material sandwiched between top and bottom composite face sheets.

9 Claims, 5 Drawing Sheets

METHOD FOR AN INTEGRAL COMPOSITE FORWARD FLANGE IN A COMPOSITE

TECHNICAL FIELD

This application generally relates to providing an integral solid laminate composite and composite sandwich structure and a method for fabrication that involves strengthening the solid laminate in bend locations and transitioning the solid laminate to a sandwich structure without creating interface defects and stress-induced material failure.

BACKGROUND OF THE INVENTION

Composite materials are widely used throughout industry. Composites have proven to provide superior strength and weight characteristics over traditional materials in many applications. A composite sandwich structure is often used in applications where minimizing weight is important. These composite sandwich structures are composed of solid composite face sheets with a lighter core material "sandwiched" between. Composite sandwich structures, while light, are often not strong enough to withstand the stresses inherent with certain applications such as use in joints or in bends. Traditionally, metal has been used in joints and around bends due to its superior isotropic strength characteristics. The metal joint or flange is bolted onto the composite sandwich structure using a splice plate. This procedure complicates the assembly process and increases fabrication costs.

It is desirable to use a solid laminate composite structure instead of metal in those situations where a sandwich structure is not adequate and then transition to a sandwich structure in one integral part without using bolts and splice plates. However, several problems arise when using a solid laminate in a bend and then transitioning to a sandwich structure. First, a composite's strength is planar. The geometry of a bend can induce high interlaminar tension stresses in a composite that can cause delamination and failure.

Another problem arises when transitioning from the solid laminate composite to a composite sandwich structure. The conventional method of transitioning to the sandwich structure involves terminating inner plies of the solid laminate, leaving a void between the top and bottom plies. The remaining top and bottom plies become face sheets, between which a core material is inserted. The termination of the inner plies of solid laminate creates an edge that abuts the core material of the sandwich structure. This interface creates two problems.

The first issue involves the termination of the individual plies within the solid laminate. Many composite materials are fabricated by layering individual plies at various orientation angles within a stacking sequence to produce a product with superior strength characteristics in various directions within a plane. However, it is difficult to terminate the plies with high precision due to the varied orientation angles. This results in a ragged or uneven edge at the interface between the solid laminate and sandwich core. The uneven edge leads to the development of defects at this interface when the part is processed. Additionally, the interface between the solid laminate and the core material induces high interlaminar stresses when the part is structurally loaded, which can lead to a material failure.

Therefore, in light of the above, there is need in the art for a method of fabricating an integral composite structure that includes solid laminate, strong enough to use in joints and in bends, and core sandwich material, in one integral composite part, without the need for bolts and splice plates.

SUMMARY OF THE INVENTION

The present invention is a laminate composite structure comprising an integral solid laminate composite and composite sandwich structure and a method for fabrication of the laminate composite structure that involves strengthening the solid laminate composite in locations where the solid laminate composite bends and transitioning of the solid laminate composite to a composite sandwich structure without creating interface defects and stress-induced material failure. In one embodiment of the present invention, the solid laminate composite is constructed by layering composite material at various orientation angles. The solid laminate composite is substantially strengthened in bend locations through insertion of a small percentage by volume of pins placed normal to the solid laminate composite surface prior to curing the laminate composite structure. Once the laminate composite structure is cured, the pins provide strength in directions outside the plane of the composite layers. This additional strength allows the solid laminate composite to endure high interlaminar stresses present in a bend that could cause delamination and material failure without the pin reinforcement.

In another embodiment, the solid laminate is transitioned into a sandwich structure that replaces inner layers of composite material with a lighter weight core material. To solve problems inherent with such a transition, the inner layers of the solid composite laminate are terminated and the outer plies of the laminate composite extend to create a top face sheet and a bottom face sheet of the sandwich structure. Prior to inserting the core material between the top face sheet and the bottom face sheet of the sandwich structure, transitional plies of material are inserted where the inner plies of the solid laminate terminate. These transitional plies where the stacking sequences are all oriented in the same direction and all terminate at the same distance, create a transition wall that abuts the core material of the sandwich structure. In a preferred embodiment the transitional plies of material are all oriented at 90 degrees. This transition wall, the top face sheet, and the bottom face sheet creates a boundary for the core material that is inserted, creating a sandwich composite structure.

In a preferred embodiment of the present invention, the transitional plies of material are all oriented 90 degrees within the stacking sequence. By layering all of the transitional plies at 90 degrees, the transitional wall created at the interface with the core material is uniform, minimizing processing defects. Additionally, the 90 degree stacking sequence creates an increased compliancy over a stacking sequence with interspersed orientations, minimizing the chance of material failure at the transition location due to high interlaminar stresses.

These and other features and advantages of the present invention will become apparent after a review of the following detailed description of the disclosed embodiments and the appended claims.

DETAILED DESCRIPTION

The present invention is directed to a laminate composite structure and a method for fabricating a laminate composite structure, which is compiled of a single integrated structure that transitions from a solid laminate composite to a composite sandwich structure without the need for splice plates and bolts. In embodiments of the invention, a solid laminate structure is formed by layering a plurality of plies of material. The plies are layered, each with a specific orientation, to create a stacking sequence. In one embodiment, a plurality of pins are inserted into the solid laminate structure where the solid laminate composite forms a bend. These pins provide "out-of-plane" strength to the laminate composite structure.

In one embodiment, where the solid laminate composite structure is transitioned to a composite sandwich structure, the inner plies of the solid laminate are terminated, leaving the outer plies extended to create a top and bottom face sheet. A second plurality of plies, herein after referred to as "transition plies," are inserted into the solid laminate and extend from the termination point of the inner plies. These transition plies are oriented in the same direction and terminate at a specified point, creating a surface normal to the top and bottom face sheets to provide increased material compliancy at the interface between the transition plies and core material. The core material is positioned between the top face sheet and bottom face sheet after the transition plies have been inserted such that the core material is bound on a first side by the top face sheet, a second side by the transition plies, and a third side by the bottom face sheet. In a preferred embodiment, the transition plies are layered such that they form a wedge shape and are oriented at substantially 90 degrees.

Another embodiment of the present invention is directed to a laminate composite structure. The structure includes a solid laminate composite consisting of layers of plies of material. These plies are layered with interspersed orientations throughout the stacking sequence. The solid laminate contains pins at locations in the geometry of the solid laminate where the structure forms a bend. The structure also consists of a composite sandwich structure. This structure has a top face sheet, a bottom face sheet, and core material disposed between. The top and bottom face sheets consist of the outermost plies of the solid laminate composite. The inner plies of the solid laminate between the top and bottom face sheets terminate. A second stack of layered plies of material is disposed between the termination location of the inner plies of the solid laminate and the core material. The second stack of plies of material are transition plies, which are layered with the same orientations throughout the stacking sequence.

Figure 1:
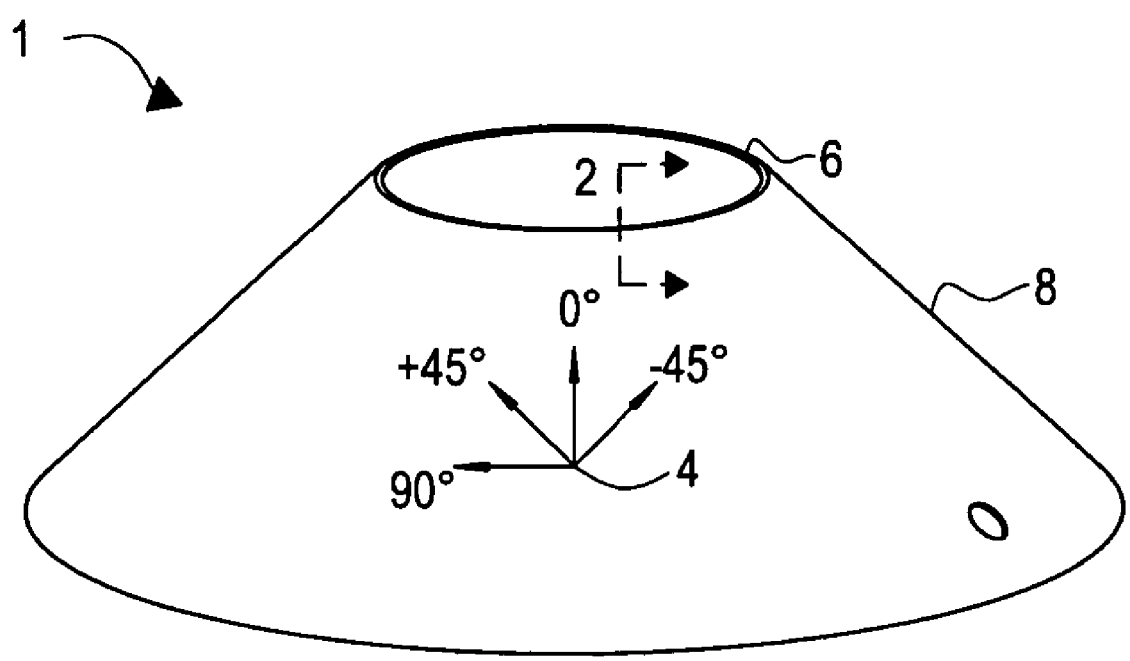
FIG. 1 is a perspective view of one embodiment of an integral composite cone comprised of a solid laminate flange and composite sandwich structure according to an embodiment of the present inventions.

Embodiments of the present invention may be described with reference to FIGS. 1–4. One embodiment of the present invention is directed to a method for fabricating a laminate composite structure. FIG. 1 depicts cone 1, an integral laminate composite structure comprising a solid laminate structure that transitions to a composite sandwich laminate structure. While the methods and structure are described herein with reference to cone 1, it is to be understood that the present invention applies equally to any laminate composite structure shape or configuration including but not limited to cones, spheres, cylinders, or any geometry for which it is desirable to strengthen laminate composite for use in a bend or to transition solid laminate composite to a composite sandwich structure in a single, integral structure.

Figure 2:
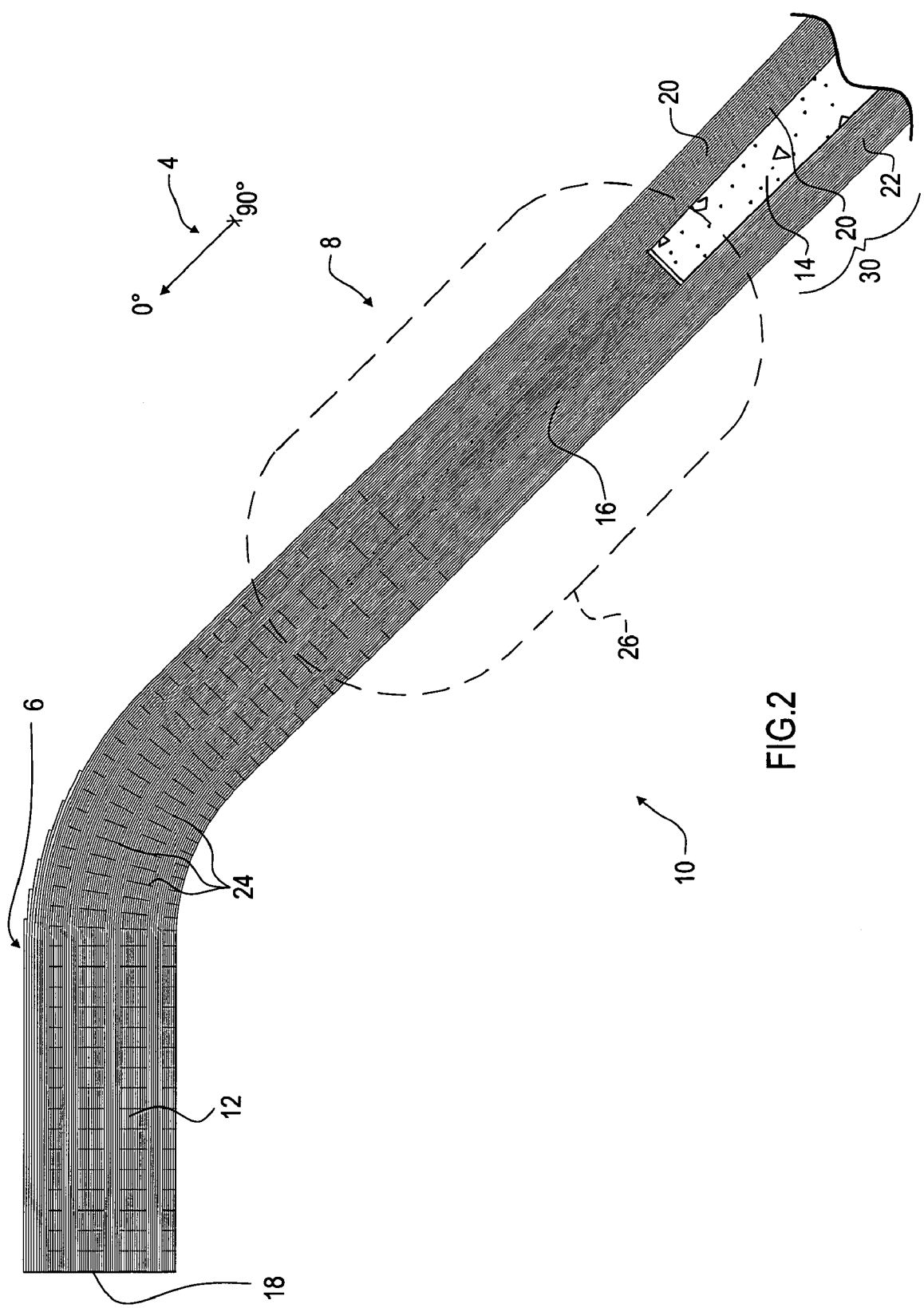
FIG. 2 is a cross-sectional view of the integral composite cone shown in FIG. 1.
Figure 3A:
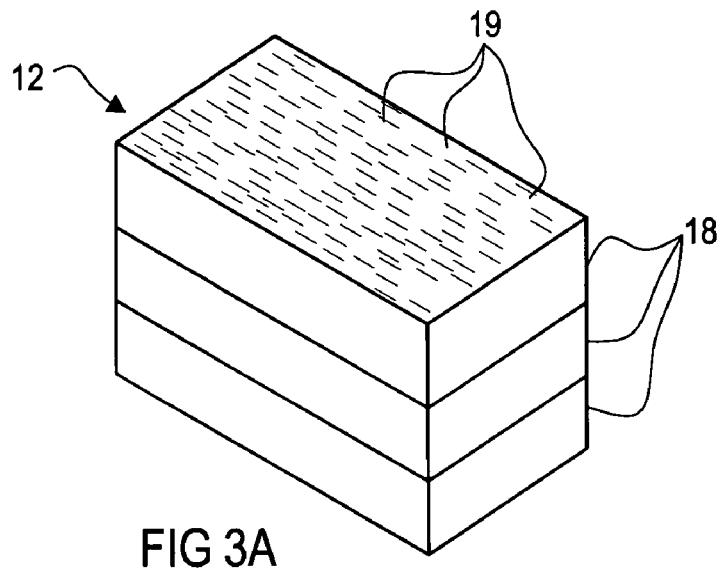
FIG. 3A is a perspective view of a solid laminate illustrating layers of individual plies of material.

A cross-section of cone 1 is depicted in FIG. 2, as laminate composite structure 10. Laminate composite structure 10 is comprised of a flange 6, a cone body 8, and transition zone 26, top face sheet 20, bottom face sheet 22 and core 14. Flange 6 is fabricated as a solid laminate composite 12. Solid laminate composite structures are fabricated in many different ways and from many different materials. Regardless of the process and material, solid laminate composite structures are fabricated by layering plies of composite material. FIG. 3A illustrates the composition of a typical solid laminate structure. The solid laminate structure is formed by layering plies of composite material 18 on top of each other. Plies of composite material 18 are composed of fibers 19. Fibers 19 may be woven in various directions or arranged substantially parallel to one another such that they are oriented in substantially the same direction, such as in a tape ply. An orientation in a single direction gives a ply of composite material 18 strength along an axis parallel to the fiber orientation, with less strength in other directions. While the plies used in embodiments of the present inventions are described as plies of composite material having a single direction, it is to be understood that plies with fibers oriented in multiple directions may also be used.

Figure 3B:
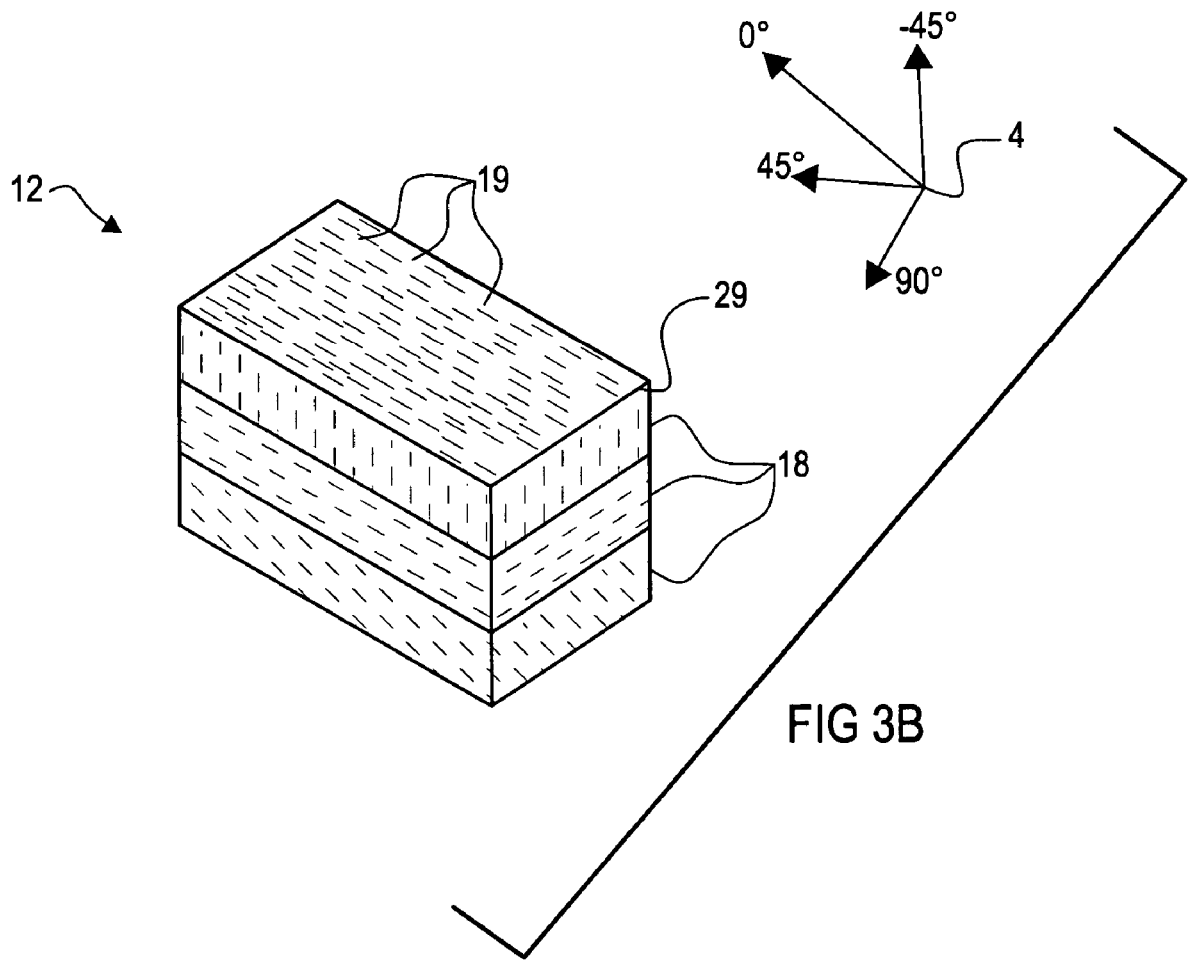
FIG. 3B is a partial exploded perspective view of an embodiment of a solid laminate composite stacking sequence according to an embodiment of the present inventions.

As a result of the linear strength characteristics of a composite material ply, solid laminate composites are often fabricated by changing the orientation of each individual ply as the composite material plies are stacked on one another. The distribution of ply orientations through the laminate composite thickness is defined as the laminate stacking sequence. Interspersed orientations throughout the stacking sequence give the structure strength in more than one direction in a plane. FIG. 3B depicts a partial exploded view of one embodiment of the solid laminate structure 12 of the present invention. Solid laminate structure 12 comprises sixty-one plies of composite material 18 with a stacking sequence of substantially alternating plies in the 0, −45, 90, and 45 degree directions (reference coordinates 4). While an exemplary embodiment of solid laminate 12 comprises sixty-one plies of composite material, it is to be understood that any number of plies may be used to construct a solid laminate composite part of desired thickness. Likewise, while an exemplary embodiment of solid laminate 12 comprises the stacking sequence discussed above and shown in FIG. 3B, it is to be understood that any stacking sequence may be used to achieve the desired properties of the solid laminate.

Referring back to FIG. 2, laminate composite structure 10 forms a 45-degree bend in flange 6. The geometry of a bend induces interlaminar tension stresses that can cause delamination and material failure. In the embodiment shown in FIG. 2, these interlaminar stresses induced by the bend in flange 6 are controlled by inserting pins 24 through the thickness of solid laminate 12. Pins 24 of one embodiment of the present invention are Z-FIBER pins fabricated by AZTEX, INC. of Waltham, Mass., approximately 0.50 inches in length and 0.01 inches in diameter, and are inserted into solid laminate 12 at an orientation substantially normal to the composite surface at a location where flange 6 forms a 45-degree bend and extending outward.

Pins 24 are inserted with the assistance of an ultrasonic transducer after the plies of solid laminate 12 have been layered, but before the laminate composite has been cured. Pins 24 are inserted in sufficient quantity, approximately equidistant to one another, to comprise approximately 2 percent of the solid laminate's volume within the 45-degree bend. As the solid laminate 12 extends outward from the 45-degree bend, the pin density decreases. Extending the pins 24 outward from the bend allows for consistent overall laminate thickness after cure, which enables specific dimensional requirements of solid laminate 12 to be met. Pins 24 enhance the out-of-plane strength of the solid laminate both in the bend and beyond the bend. Decreasing the pin density as solid laminate 12 extends outward from the bend eliminates the creation of an abrupt thickness change in solid laminate 12 due to the presence of the pins 24.

While the laminate composite structure 10, as shown in FIG. 2, comprises a 45-degree bend in the solid laminate 12, it is to be understood that pins 24 may be used to strengthen laminate composite material that forms a bend of any angle. Moreover, while pins 24 are Z-FIBER pins fabricated by AZTEX, INC. of Waltham, Mass., one skilled in the art may recognize that pins 24 may be pins manufactured from any material, including but not limited to aluminum, titanium, glass, carbon or ceramic fibers in polymer based resins. Pins 24 may be of any cross-sectional geometry and dimension, and may be inserted into the composite surface at any angle and with any pin density or pattern, depending on the desired properties of the solid laminate composite. Further, it is to be understood that pins 24 may be inserted using any method now known or developed in the future.

Figure 4:
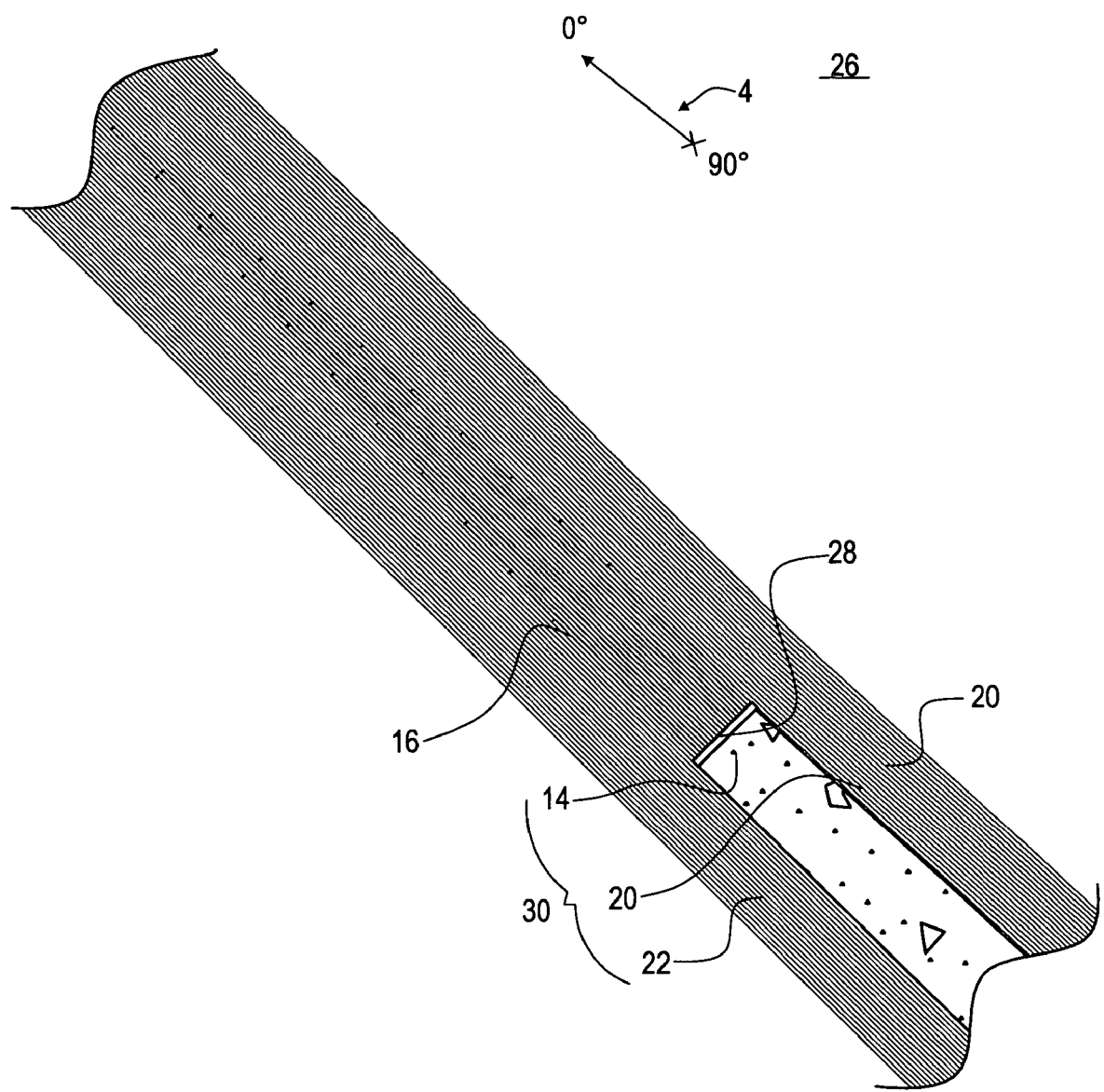
FIG. 4 is an enlarged cross-sectional view of the transition from solid laminate to core material in the integral composite cone as shown in FIG. 2.

As illustrated in FIGS. 2 and 4 another aspect of the present invention is directed to the transitioning between the inner plies of solid laminate 12 and core material 14. As illustrated, the transition is fabricated in a manner to minimize the defects at interface 28 between the inner plies and core material 14 and to control the high interlaminar stresses inherent at interface 28. FIG. 4 displays an enlargement of transition zone 26, illustrating the transition between solid laminate 12 and composite sandwich structure 30. Composite sandwich structure 30 is comprised of top face sheet 20, bottom face sheet 22, and core material 14.

Composite sandwich structure 30 is constructed by first terminating the twenty-one innermost plies of solid laminate 12. The outermost twenty top plies of solid laminate 12 continue to extend to create top face sheet 20 and the outermost twenty bottom plies of solid laminate 12 continue to extend to create bottom face sheet 22. Core material 14 fills the void between top face sheet 20 and bottom face sheet 22 such that a first side of the core material abuts top face sheet 20 and a third side of core material 14 abuts bottom face sheet 22 to create the sandwich structure. It is to be understood that any number of plies of material may be terminated to create a composite sandwich structure with desired properties. Likewise, any number of material plies may be extended to form a top face sheet and a bottom face sheet, independent of one another.

Prior to inserting core material 14 between top face sheet 20 and bottom face sheet 22 of composite sandwich structure, the twemt-one transition plies 16 are inserted into the laminate composite where the inner plies of solid laminate 12 terminate. The termination location of each transition ply creates an edge 29 that abuts a second side of core material 14 when core material 14 is inserted between top face sheet 20 and bottom face sheet 22. Together, edges 29 of each transition ply form a surface that abuts a second side of core material 14, creating interface 28. In the embodiment shown in FIG. 4, each ply within transition plies 16 terminates at the same location approximately 2.25 inches from the 45-degree bend, such that the surface created by edges 29 is normal to top and bottom face sheets 20, 22. The first transition ply begins approximately 0.61 inches from the 45-degree bend. It is to be understood that the beginning and terminating points of the transition plies will vary depending on the desired geometry of the finished product and its desired properties.

Figure 3C:
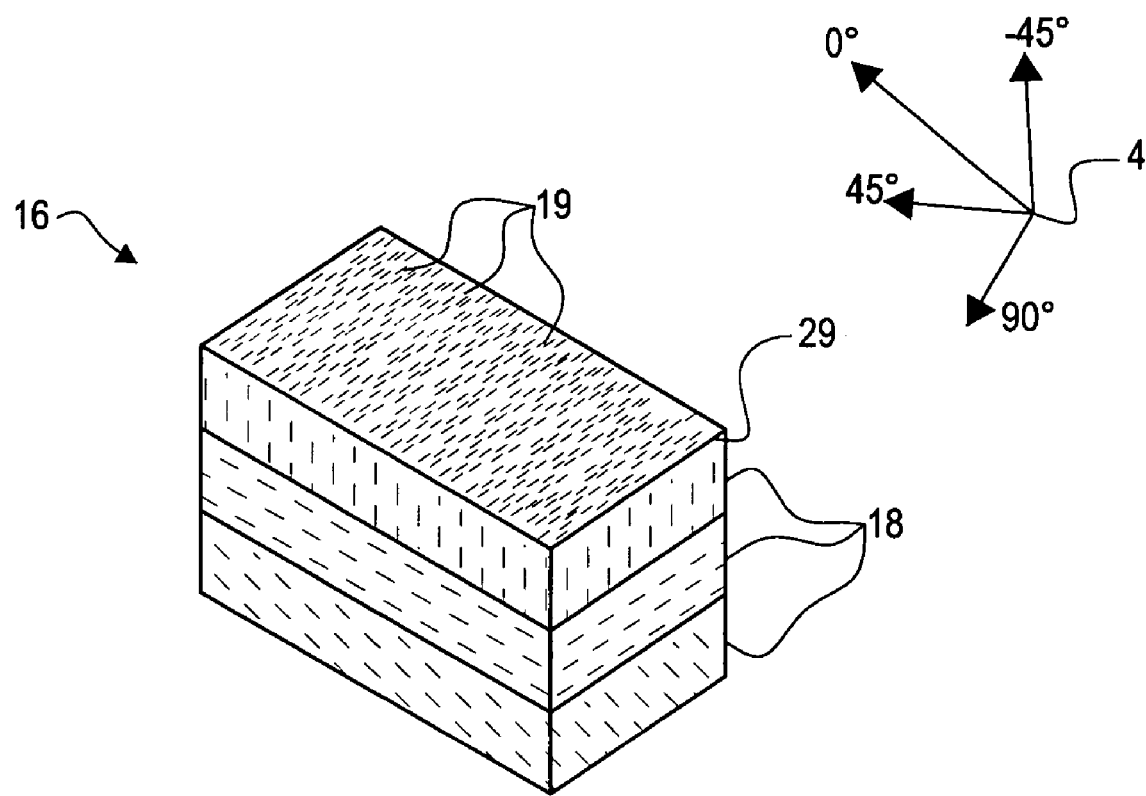
FIG. 3C is a partial exploded perspective view of an embodiment of the stacking sequence of the transition plies according to an embodiment of the present inventions.

In another embodiment of the present invention, transition plies 16 are oriented at substantially 90 degrees (see FIG. 3C and coordinates 4). Orienting transition plies 16 at 90 degrees has two principle benefits. First, when oriented at 90 degrees, the fibers 19 within transition plies 16 are parallel to edge 29. Transition plies 16 can be terminated with much greater precision when all fibers 19 are oriented in a direction parallel to an edge to be cut than if orientations were interspersed within the transition ply stacking sequence. Manufacturing equipment typically allows a much more precise cut when cutting essentially between fibers, as seen at edge 29 of FIG. 3C, rather than across fibers, as seen at edge 29 of FIG. 3B. This increased precision minimizes the development of defects at interface 28 when the laminate composite is processed. By minimizing defects, the stresses induced by those defects are minimized, which reduces the risk of material failure.

Second, by orienting all of the transition plies 90 degrees, transition plies 16 become much more compliant than a laminate stacking sequence of interspersed orientations. This increased compliancy allows transition plies 16 to better absorb and distribute the interlaminar tension stresses caused by interface 28. In one embodiment depicted in FIG. 4, the inner plies of solid laminate 12 are terminated sequentially, beginning with the innermost plies and continuing outward toward the top and bottom face sheets 20, 22. By layering the transition plies 16 such that the first end of each ply begins where an inner ply of solid laminate 12 terminates, a wedge of transition plies is created. This wedge of transition plies 16 allows for a smooth transition from solid laminate 12 to the sandwich structure 30, increasing the compliancy of the inner plies as they approach interface 28 by maintaining the number of plies within the solid laminate, but altering the stacking sequence.

It is to be understood that the beginning and terminating points of the transition plies will vary depending on the desired geometry of the finished product and its desired properties. While transition plies 16 are oriented at substantially 90 degrees and are layered to form a symmetrical wedge-shaped cross-section as shown in FIG. 4, it is to be understood that the transition plies do not need to have 90-degree orientations throughout the stacking sequence. Transition plies may have any stacking sequence orientations that allow for any degree of increased compliancy over that of the solid laminate. Additionally, transition plies may be layered to form limitless other cross-sectional shapes of varied dimensions including but not limited to an asymmetrical wedge, a rectangle, a square, a diamond, a triangle, a semi-circle, and a semi-oval. There may also be embodiments of the present invention wherein the number of plies within the solid laminate does not remain the same after insertion of the transition plies.

Another embodiment of the present invention is directed to laminate composite structure 10 of FIG. 2. Laminate composite structure 10 is comprised of solid laminate 12, sandwich structure 30, and pins 24 internal to solid laminate 12 in locations where solid laminate 12 forms a bend. Solid laminate 12 is a composite structure formed from sixty-one plies of material layered at interspersed orientations within a stacking sequence.

Sandwich structure 30 is comprised of top face sheet 20, bottom face sheet 22, and core material 14. The top twenty and bottom twenty plies of material that are part of the solid laminate extend beyond termination locations of the innermost twenty-one plies of the solid laminate to create the top face sheet 20 and bottom face sheet 22. Core material 14 is disposed inside the composite sandwich structure 30 such that a first side of core material 14 is adjacent to top face sheet 20 and a third side is adjacent to bottom face sheet 22. It should be noted that the number of plies within solid laminate 12 and the top and bottom face sheets 20, 22 may very. Additionally, it is to be understood that the top face sheet 20 and bottom face sheet 22 may not contain the same number of plies in each or an unequivalent number of plies, as well as the ratio of face sheet plies to the number of terminated inner plies may also vary in alternative embodiments of the present invention.

While the invention has been particularly shown and described with reference to preferred embodiments thereof, it will be understood by those skilled in the art that various other changes in the form and details may be made therein without departing from the spirit and scope of the invention. The foregoing description of the exemplary embodiments of the invention has been presented for purposes of illustration and description. It is not intended to be exhaustive or to limit the invention to the precise form disclosed. Many modifications and variations are possible in light of the above teaching. It is intended that the scope of the invention be limited not with this detailed description but rather by the claims appended hereto.

We claim:

1. A method for fabricating a laminate composite structure comprised of a solid laminate and a composite sandwich structure, the method comprising:
    layering a plurality of plies of material with interspersed orientations within a stacking sequence to create the solid laminate;
    terminating a plurality of inner plies of the solid laminate such that outer plies of the laminate composite extend to create a top face sheet and a bottom face sheet of the composite sandwich structure;
    inserting a second plurality of plies of material in the laminate composite structure where the inner plies of the solid laminate terminate and extending the second plurality of plies of material from the point of termination of the inner plies for a specified distance, wherein the second plurality of plies of material do not extend as long as the top face sheet and the bottom face sheet of the composite sandwich structure; and
    inserting a plurality of pins into the solid laminate composite, prior to curing the laminate composite, at locations in the geometry of the solid laminate where the solid laminate forms a bend.

2. The method of claim 1 wherein the plurality of pins are composite material inserted substantially normal to the laminate composite surface.

3. The method of claim 1, wherein the location of the plurality of pins extends beyond the bend in the solid laminate.

4. The method of claim 3, wherein the plurality of pins are inserted into the solid laminate with decreasing density as the location of the plurality of pins extends outward from the bend.

5. The method of claim 1 further comprising
    inserting core material into a void in the laminate composite bounded by the termination of the second plurality of plies of material, the top face sheet, and the bottom face sheet.

6. The method of claim 5 wherein the plurality of inner plies of the solid laminate are terminated sequentially, beginning with the innermost ply first and continuing outward toward the top and bottom face sheets, and wherein each ply of the second plurality of plies of material begins where an inner ply of the solid laminate terminates and each ply of the second plurality of plies of material terminates in the same location, creating a wedge of material plies inserted into the laminate composite.

7. The method of claim 5 wherein the second plurality of plies of material are all oriented at substantially 90 degrees.

8. The method of claim 1 wherein inserting a plurality of pins into the solid laminate composite comprises inserting a volume of pins such that the plurality of pins comprises approximately two percent of the volume of the solid laminate at the bend.

9. The method of claim 1, wherein inserting a plurality of pins into the solid laminate composite comprises inserting a volume of pins such that the plurality of pins are equidistant from one another.

* * * * *